(12) United States Patent
Hegedus et al.

(10) Patent No.: US 10,126,176 B2
(45) Date of Patent: Nov. 13, 2018

(54) SENSOR CONTAINER FOR MOUNTING A TEMPERATURE SENSOR, AND ASSOCIATED REFRIGERATOR

(71) Applicant: Thermo Fisher Scientific (Asheville) LLC, Asheville, NC (US)

(72) Inventors: Ralph Hegedus, Candler, NC (US); Kathleen Danielle Snyder, Asheville, NC (US); Vikram Raj Kamgar, Telangana (IN); Jesse Shoup, Weaverville, NC (US)

(73) Assignee: Thermo Fisher Scientific (Asheville) LLC, Asheville, NC (US)

( * ) Notice: Subject to any disclaimer, the term of this patent is extended or adjusted under 35 U.S.C. 154(b) by 279 days.

(21) Appl. No.: 15/134,671

(22) Filed: Apr. 21, 2016

(65) Prior Publication Data

US 2017/0307446 A1    Oct. 26, 2017

(51) Int. Cl.
  *G01K 1/08* (2006.01)
  *F25D 29/00* (2006.01)
  *A61J 1/16* (2006.01)

(52) U.S. Cl.
  CPC ............. *G01K 1/08* (2013.01); *F25D 29/005* (2013.01); *F25D 29/008* (2013.01); *A61J 1/165* (2013.01); *F25D 2400/36* (2013.01); *F25D 2700/12* (2013.01); *F25D 2700/123* (2013.01); *F25D 2700/16* (2013.01)

(58) Field of Classification Search
  CPC .... A61J 1/165; F25D 2700/12; F25D 29/005; G01K 1/08
  USPC .......................................................... 62/129
  See application file for complete search history.

(56) References Cited

U.S. PATENT DOCUMENTS

| | | | |
|---|---|---|---|
| 2,741,099 A * | 4/1956 | Beane | F25D 29/008 340/585 |
| 3,100,383 A | 8/1963 | Foster | |
| 3,343,151 A | 9/1967 | Brown | |
| 4,011,552 A | 3/1977 | Quirke | |
| 4,184,340 A | 1/1980 | Laughlin et al. | |
| 5,242,314 A * | 9/1993 | Di Giulio | H01R 12/714 439/289 |

(Continued)

FOREIGN PATENT DOCUMENTS

EP        2392902 A1    12/2011

*Primary Examiner* — Henry Crenshaw
(74) *Attorney, Agent, or Firm* — Wood Herron & Evans LLP

(57) ABSTRACT

A refrigerator for storing products includes a sensor container configured to position at least one temperature sensor within a refrigerated interior in a cabinet of the refrigerator. The sensor container includes a main body portion enclosing a hollow interior space configured to receive a ballast liquid, and a plurality of dry wells which each extend generally horizontally between a closed end within the hollow interior space and an open end. The temperature sensors positioned in the dry wells are surrounded by ballast liquid but are not in direct contact with refrigerated air within the cabinet or the ballast liquid. The temperature measurements therefore approximate the thermal response of products (such as blood) stored in the cabinet without necessitating submersible sensors or a risk of liquid leaks. The temperature measurements may be sent to elements such as a chart recorder, and a display and alarm device associated with the refrigerator.

14 Claims, 4 Drawing Sheets

(56) References Cited

U.S. PATENT DOCUMENTS

| | | | |
|---|---|---|---|
| 5,488,835 A * | 2/1996 | Howenstine | F25D 17/067 62/186 |
| 5,572,873 A | 11/1996 | Lavigne et al. | |
| 5,687,580 A * | 11/1997 | Jeong | F25D 17/045 62/186 |
| 6,018,956 A * | 2/2000 | Sakata | F25D 29/005 220/694 |
| 6,119,305 A * | 9/2000 | Loveall | F16L 5/10 16/2.2 |
| 6,158,227 A | 12/2000 | Seeley | |
| 8,096,141 B2 | 1/2012 | VanderZee | |
| 8,185,246 B2 | 5/2012 | Josserand et al. | |
| 8,209,057 B2 | 6/2012 | Judge et al. | |
| 8,231,229 B2 | 7/2012 | Kanbara et al. | |
| 8,267,575 B2 | 9/2012 | Tavener | |
| 8,491,184 B2 | 7/2013 | Kamen et al. | |
| 8,769,981 B2 | 7/2014 | Hong et al. | |
| 8,881,540 B1 * | 11/2014 | Barakat | F25D 3/06 414/222.02 |
| 8,985,133 B2 | 3/2015 | Grant et al. | |
| 8,992,075 B2 | 3/2015 | Kamen et al. | |
| 2003/0115892 A1 * | 6/2003 | Fu | F25D 17/042 62/187 |
| 2009/0064693 A1 | 3/2009 | Matsiev et al. | |
| 2010/0126204 A1 * | 5/2010 | Martin | F25C 5/24 62/344 |
| 2010/0299278 A1 * | 11/2010 | Kriss | G06Q 10/08 705/332 |
| 2012/0039362 A1 * | 2/2012 | Pedersen | G01K 1/08 374/208 |
| 2013/0055734 A1 | 3/2013 | Wu et al. | |
| 2013/0086933 A1 | 4/2013 | Holtkamp et al. | |
| 2013/0098078 A1 * | 4/2013 | Contreras Lafaire | F25D 21/06 62/82 |
| 2014/0250919 A1 | 9/2014 | Obermaier | |
| 2015/0204807 A1 | 7/2015 | Kamen et al. | |

* cited by examiner

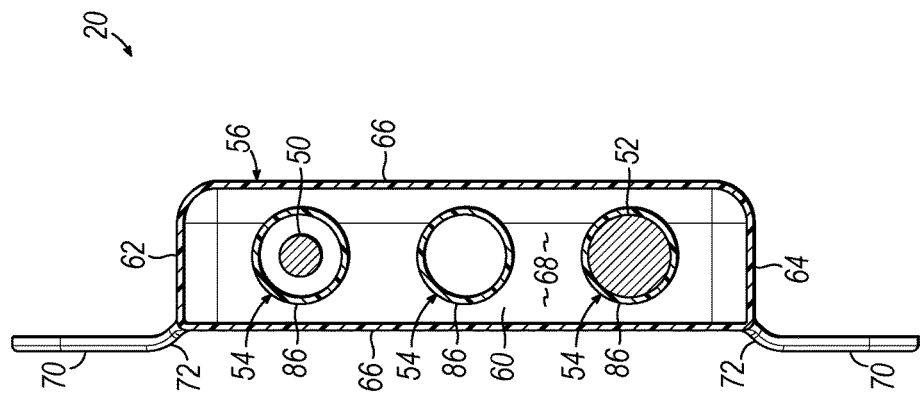
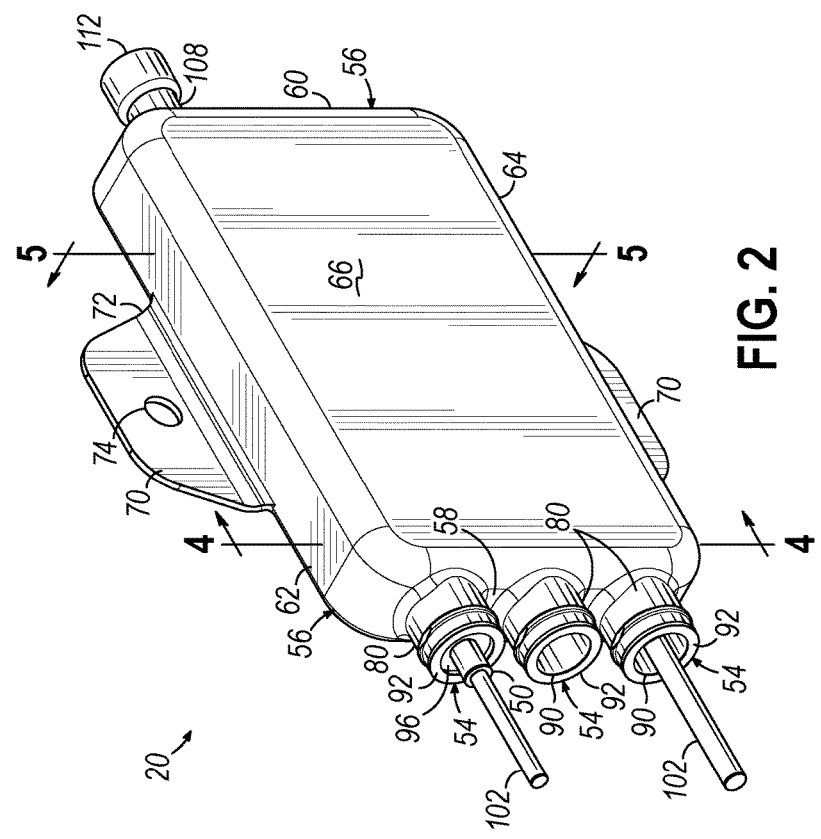

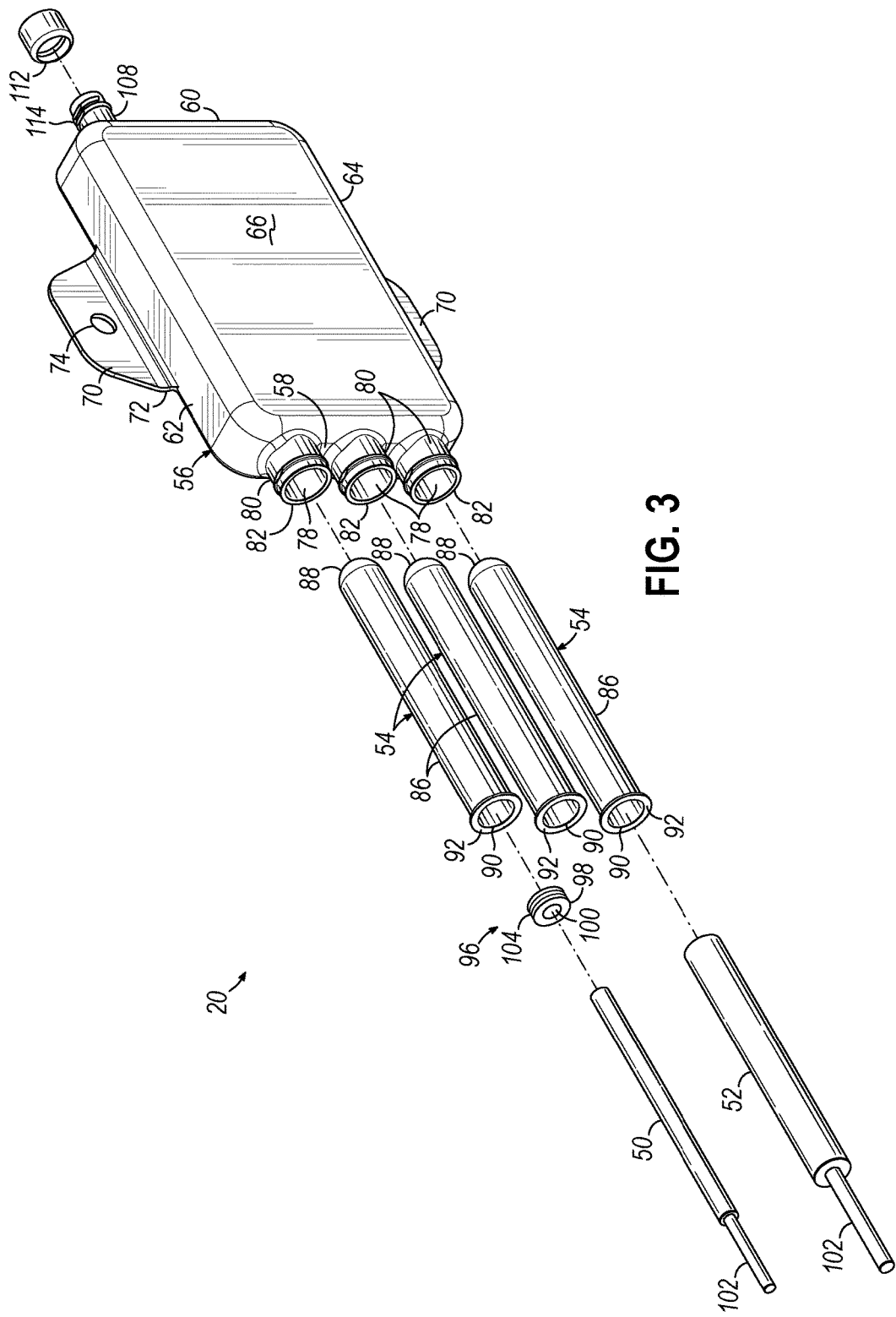

SENSOR CONTAINER FOR MOUNTING A TEMPERATURE SENSOR, AND ASSOCIATED REFRIGERATOR

TECHNICAL FIELD

The present invention relates generally to refrigerators and, more particularly, to sensor mounting containers for holding temperature sensors in refrigerators and freezers where temperature-sensitive products are stored.

BACKGROUND

Refrigeration systems are known for use with laboratory refrigerators and freezers of the type known as "high performance refrigerators" (the "high performance" label typically depending on specific limitations of peak temperature variation allowed within the refrigerator), which are used to cool their interior storage spaces to relative low temperatures such as about +4° C., −30° C. or lower, for example. These high performance refrigerators are used to store blood and/or plasma, in one example. It is typical in such refrigerators to have temperature sensor(s) which measure the air temperature within a cooled cabinet such that the temperature of products stored in the cabinet can be maintained at a desired level. When such products in the cabinet include blood or medicines, certain international or domestic standards may apply for how the temperature of such products needs to be regulated. Depending on how strict these standards can be, reliance solely on air temperatures when controlling the refrigeration systems may not be preferred to comply with the standards for cold storage of products like blood and medicines. For example, if a small temperature variation in the air temperature from a set point were only transitory and did not substantially affect the temperature of the products, a "false positive" activation of the refrigeration system may be caused when such an activation was not actually necessary, in these embodiments which only rely on air temperatures.

As a result, sensor mounting containers have been developed for use with these refrigerators and freezers containing temperature-sensitive products, with these sensor mounting containers including a ballast liquid, such as water, that a temperature sensor is inserted into rather than being directly exposed to the refrigerated air within the cooled cabinet. One example of such a conventional sensor mounting container is the sensor probe bottle included with laboratory refrigerators and freezers manufactured and distributed by the Applicant of the present invention (Thermo Fisher Scientific, of Asheville, N.C.). The sensor probe bottle is a container having a threaded neck and opening at the top end thereof, with the container being configured to hold a quantity of ballast liquid such as a solution of water and propylene glycol. The sensor probe bottle is mounted to a sidewall of the cooled cabinet, such as in a bracket secured to the sidewall, with a solid cap secured on the threaded neck to close the opening thereof. Another cap with a hole cut through the middle is provided to the customer, with one or more temperature sensors extending through the hole. In use, this cap is installed on the sensor probe bottle such that the temperature sensor(s) are inserted into the ballast liquid during use. These temperature sensors may be connected to display/alarm devices of the refrigerator or freezer, and/or also connected to the refrigeration system controlling the temperature within the cabinet. By placing the temperature sensor(s) in contact with ballast liquid instead of in direct contact with refrigerated air in the cooled cabinet, a better approximation of temperature of the products stored in the cabinet can be provided to the elements connected to the temperature sensor(s), e.g., the water/glycol solution can approximate products like blood and certain medicines which may be stored in the refrigerator or freezer.

However, the sensor probe bottle requires the use of temperature sensors which can operate while submersed in liquid, and such temperature sensors tend to be more expensive and complex than alternative sensors and probes. This additional expense comes from the need for protective equipment and heat conductive mediums that must be added to temperature sensors to make them submersible. Moreover, the opening in the bottle and the hole in the cap receiving the temperature sensor(s) provides a potential source of spillage or leakage of the ballast liquid when sensors are being positioned or replaced by a customer. While such spillage can be avoided when using the sensor probe bottle, the risk cannot be completely eliminated using the caps of the current design.

Other examples of prior sensor mounting containers are shown in U.S. Pat. No. 2,741,099 to Beane and U.S. Pat. No. 6,018,956 to Sakata et al. The containers shown in these documents fail to cure some of the drawbacks for sensor bottles and containers designed to position a temperature sensor in a ballast liquid. Furthermore, such container designs typically require specific positioning within a cooled cabinet at positions that negatively impact the total storage capacity within the cabinet.

There is a need, therefore, for further improvements in sensor mounting containers and the laboratory refrigerators and freezers using such sensor mounting containers for monitoring temperature of products stored in the laboratory refrigerators and freezers, which address these and other deficiencies of known designs.

SUMMARY

According to one embodiment of the present invention, a sensor container is provided that is configured to receive multiple temperature sensors of varying shapes and sizes, and to position such sensors in an environment surrounded by a ballast liquid to simulate the response of products stored in a cooled refrigerator cabinet to temperature changes in the cabinet. The sensor container is preferably also designed to prevent liquid leaks of ballast liquid into the cabinet and to avoid significant negative impact on useable storage space for products within the cabinet. The sensor container simplifies customer interaction with the temperature sensors and may be provided with temperature sensors that are used in at least several different manners and contexts within the refrigeration field.

In one embodiment, a sensor container is configured to position at least one temperature sensor within a refrigerated interior of a refrigerator cabinet. The sensor container includes a main body portion having a plurality of walls enclosing a hollow interior space configured to receive a ballast liquid. The main body portion also includes a plurality of openings located in at least one of the plurality of walls. The sensor container also includes a plurality of dry wells each including a tubular body inserted into the main body portion so as to extend between a closed end located within the hollow interior space and an open end permanently coupled to the main body portion at one of the plurality of openings. The dry wells are configured to receive a temperature sensor, and the open ends of the dry wells form a seal so as to prevent fluid communication between the hollow interior space and the refrigerated interior at the plurality of openings. Thus, liquid leakage from the hollow interior space is prevented. When at least one temperature sensor is inserted into the plurality of dry wells, the ballast liquid surrounds the at least one temperature sensor without contacting the sensor(s). This arrangement isolates the at least one temperature sensor from direct contact with the refrigerated air within the refrigerated interior and also from direct contact with the ballast liquid, while dampening sensor response to temperature fluctuations in air in the refrigerated interior. Accordingly, the at least one temperature sensor accurately measures a temperature that approximates the thermal response of products stored in the refrigerator cabinet, such as blood or medicines, without requiring submersion into liquid or any risk of liquid leaks into the cabinet.

In one aspect, the sensor container also includes a fill port formed in the main body portion and a fill cap removably coupled to the fill port. The fill port is configured to selectively provide communication between the hollow interior space and an external environment outside the sensor container, and this allows for the ballast liquid to be drained or refilled when necessary. As will be understood, the fill port is provided proximate a top end of the hollow interior space such that the ballast liquid does not pour out in its entirety when the fill cap is opened. The fill cap selectively prevents fluid communication through the fill port, such as when the sensor container is filled with the ballast liquid. The plurality of openings in the sensor container are located along one of the plurality of walls in some embodiments, and the fill port is provided in a different one of the plurality of walls, such as along an opposite sidewall from the sidewall where the plurality of openings are located. The fill port may face rearwardly towards the back of the refrigerator cabinet in one installation, while the plurality of openings face the front or door of the refrigerator cabinet. Such an arrangement of the sensor container advantageously enables the sensor container to be positioned near a top corner of the refrigerator cabinet, with the tubular body of each of the dry wells extending generally horizontally within the hollow interior space. While this positioning of the sensor container avoids undesirable limitations on the storage space that is useable within the refrigerator cabinet, the temperature sensors (and optionally also the fill port) can still be accessed and used by the end customer without necessitating dismounting of the sensor container from the cabinet.

In another aspect, the main body portion further includes a plurality of neck portions which project outwardly from one of the plurality of walls to thereby define the plurality of openings. Each of the neck portions includes an end surface. Each of the plurality of dry wells further includes a flange projecting radially outwardly from the tubular body at the open end, with the flange being positioned in abutment with the end surface of a corresponding one of the plurality of neck portions. For example, the tubular body of each of the dry wells is welded to the corresponding one of the plurality of neck portions adjacent the abutment of the flange and the end surface when permanently coupling these elements together. Other types of permanent coupling may be used depending on the materials selected for the dry wells and the main body portion, which are made from high-density polyethylene in one example.

The sensor container according to one embodiment includes first, second, and third openings, with first, second, and third dry wells associated with those openings. At least one of the first, second, and third dry wells is sized large enough to receive temperature sensors containing Peltier elements (also referred to in the art as "heating probes").

When each of the dry wells is sized the same, all of the first, second, and third dry wells is large enough to accommodate such larger temperature sensors. Each of the first, second, and third dry wells further includes a retainer cap that is removably inserted into the corresponding open end to thereby prevent air flow into the corresponding dry well when a temperature sensor which is smaller in size than the open end is inserted into the dry well. Thus, the sensor(s) in the dry well(s) remain isolated from direct contact with cool air in the cabinet, regardless of the size of the sensor(s).

In yet another aspect, the sensor container is loaded with first and second temperature sensors positioned in two of the plurality of dry wells. The first and second temperature sensors provide temperature measurement signals to a chart recorder and/or a display and alarm device on the refrigerator cabinet. To this end, the first and second temperature sensors in such an arrangement are not connected to a refrigeration system associated with the refrigerator cabinet, and therefore would not be used to control the temperature within the refrigerated interior. However, it will be understood that a further sensor could also be loaded in another of the plurality of dry wells and used for temperature control alone or in combination with open air temperature sensor(s), in alternative embodiments of this disclosure. In still other alternative embodiments, one or more temperature sensors connected to the refrigeration system for temperature control are positioned in a different location of the refrigerated interior than the sensor container, and these one or more temperature sensors may be in direct contact with the cooled air in the cabinet.

In another embodiment in accordance with this disclosure, a refrigerator includes a cabinet with a refrigerated interior, a refrigeration system for circulating a refrigerant and for removing heat energy from the refrigerated interior, and a sensor container for positioning at least one temperature sensor within the refrigerated interior. The sensor container includes any or all of the features described above, such as a main body portion enclosing a hollow interior space configured to receive a ballast liquid, and a plurality of dry wells which each extend between a closed end within the hollow interior space and an open end. Therefore, the refrigerator of this embodiment is provided with temperature sensors which will output a temperature measurement signal accurately approximating the thermal response of products stored in the refrigerator, such as blood or medicines, for example.

The refrigerated interior of the cabinet defines a storage space for products to be stored, this storage space located inside a plurality of sidewalls, a top wall, and a bottom wall of the cabinet. The sensor container is mounted to one of the sidewalls at a location proximate the top wall, which allows for the sensor container to not substantially interfere with use of the storage space defined within the refrigerated interior. Furthermore, the tubular body of each of the dry wells extends generally horizontally within the hollow interior space of the sensor container when the sensor container is installed within the cabinet. As such, the top wall does not occlude insertion and removal of the at least one temperature sensor to and from the dry wells. Moreover, the wall of the main body portion including the openings may face towards a door or opening in the cabinet, further enhancing the accessibility for a customer when maintenance or replacement of the temperature sensors is desired. It will be understood that the fill port, which is typically on an opposite wall of the main body portion, will be disposed proximate the top wall of the cabinet as well in this configuration. This specific positioning and orientation of the sensor container provides advantages as set forth herein, and it may be combined with any or all of the other features described in association with the sensor container of this disclosure.

These and other objects and advantages of the invention will become more readily apparent during the following detailed description taken in conjunction with the drawings herein.

BRIEF DESCRIPTION OF THE DRAWINGS

FIG. 2 is a detailed perspective view of the sensor container used with the refrigerator of FIG. 1, in a fully assembled state with the temperature sensors installed.

FIG. 3 is a perspective view of the sensor container and temperature sensors shown in FIG. 2, but in a partially exploded state for further clarity.

FIG. 4 is a cross-sectional side view of the sensor container and temperature sensors of FIG. 2, taken along line 4-4 in FIG. 2.

DETAILED DESCRIPTION

Figure 1:
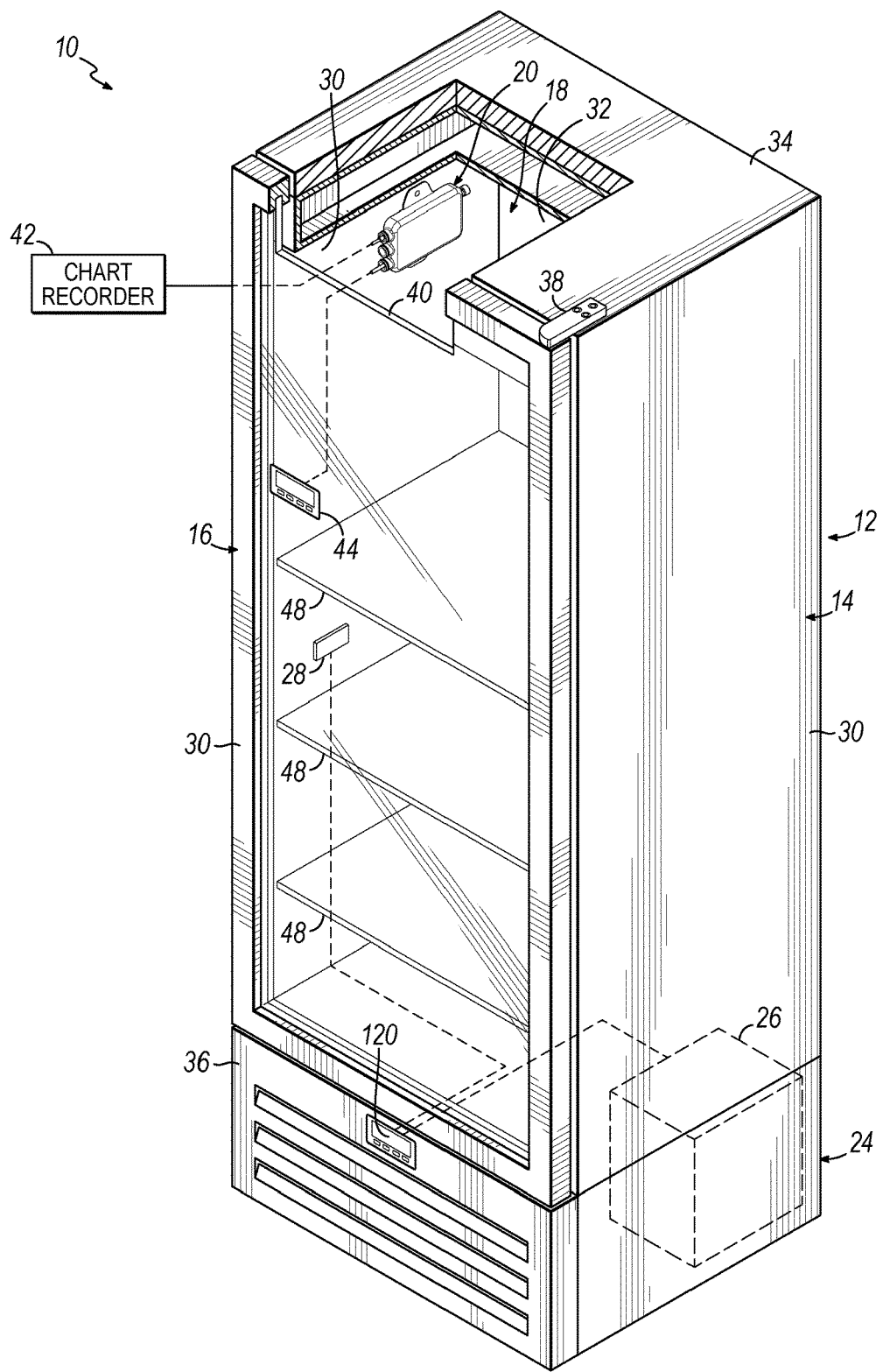
FIG. 1 is a perspective view of a refrigerator including a sensor container that mounts a plurality of temperature sensors within a refrigerated interior of a cabinet, according to an exemplary embodiment, with a portion of a top wall of the cabinet cut away so that the sensor container is visible.

With reference to the figures, and more specifically to FIGS. 1 through 5, an exemplary high performance laboratory refrigerator 10 according to one embodiment of the present invention is illustrated. Although the terms "high performance laboratory refrigerator" and "refrigerator" are used throughout the specification, it will be understood that the invention encompasses any type of cooling device, including any type of refrigerator or freezer. The refrigerator 10 of FIG. 1 includes a cabinet 12 for storing items that require cooling to temperatures of about +4° C. or lower, for example. The cabinet 12 includes a cabinet housing 14 defining a generally rectangular cross-section and a door 16 providing access through a cabinet opening into a refrigerated interior 18 of the cabinet 12, the refrigerated interior 18 being configured to receive products to be maintained at a cooled temperature such as blood samples or medicines. In order to help monitor the temperature of such products in the interior 18, the refrigerator 10 of this embodiment advantageously includes a sensor container 20 for positioning at least one temperature sensor (not shown in FIG. 1) inside the refrigerated interior 18 in such a manner that each sensor approximates the thermal response of the products held in the interior 18. As set forth in further detail below, the sensor container 20 allows for multiple sensors or probes of varying shape and size to be installed in the cabinet 12 without necessitating that the sensors or probes be submersed in liquid, and also without risking ballast liquid leaks within the cabinet 12. Therefore, a temperature sensor is mounted in a cost-efficient and space-efficient manner, allowing for generation of temperature measurement signals for various other components in the refrigerator 10.

Returning with specific reference to the perspective view of the refrigerator 10 in FIG. 1, the cabinet housing 14 also encloses a deck 24 positioned below the refrigerated interior 18, the deck 24 configured in this embodiment to contain elements of a refrigeration system 26 (shown as a schematic box element in FIG. 1) for thermally interacting with the refrigerated air within the cabinet 12 to cool the interior 18 and products stored therein. Other embodiments of the refrigerator 10 within the scope of this invention may include the deck 24 and refrigeration system 26 above the cabinet 12 or in some other location than that shown in the Figures. The refrigeration system 26 may include a single-stage refrigeration fluid circuit of various known designs, as the particular type of system is not directly pertinent to the innovative features described herein for the refrigerator 10. Regardless of the specific design, the refrigeration system 26 removes heat energy from air in the interior 18 and from products in the cabinet 12 to maintain the temperature of these elements at a desired temperature, such as about +4° C., for example. The refrigeration system 26 can be controlled using one or more temperature sensors as set forth in further detail below. One such temperature sensor is the open air sensor 28 shown mounted within the cabinet 12 in FIG. 1.

The cabinet housing 14 defines a rectangular cross-section by including opposed and generally parallel sidewalls 30 and a back wall 32 which extend between a top wall 34 and the deck 24. A portion of the top wall 34 and the door 16 are shown cut away in FIG. 1 for illustrative purposes only. In the embodiment of the refrigerator 10 shown in FIG. 1, a front wall 36 is located only at the deck 24 because the door 16 covers an entire side of the cabinet housing 14 at the front when in the closed position as shown. The door 16 is pivotally coupled to the cabinet housing 14 at a hinge 38 so that the door 16 can be moved to an open position (not shown) to enable access into the refrigerated interior 18. The door 16 of this embodiment of the refrigerator 10 includes a glass window 40 through which the interior 18 and the products stored therein can be viewed from outside the refrigerator 10, which may be advantageous when trying to limit unnecessary door opening events. The periphery of the glass window 40 at the remainder of door 16 and each of the front wall 36, back wall 32, and sidewalls 30 are insulated with foam insulation material or the like so that a colder environmental condition can be maintained in the interior 18 relative to the ambient environment outside the refrigerator 10. This temperature within the refrigerator 10 can be recorded over time using a chart recorder 42 shown schematically and/or with a display and alarm device 44, as is well understood in the field of refrigerators. The display and alarm device 44 is shown at the door 16, but it will be understood that such a feature could be positioned at different locations of the refrigerator 10 in other embodiments. It will be understood in view of the description of the sensor container 20 below that the "temperature within the refrigerator 10" which is sent to the chart recorder 42 and/or to the display and alarm device 44 in this embodiment of the refrigerator 10 is an approximation of temperature within products or materials stored in the interior 18, not just the air temperature within the interior 18.

The refrigerated interior 18 is typically divided into several storage spaces using shelves, drawers, and the like. In the embodiment shown in FIG. 1, several shelves 48 are visible through the glass window 40 of the door 16, for example. It will be understood that the products to be stored and/or storage baskets and racks containing such products can be placed on the shelves 48 for cooling by the refrigerator 10. Moreover, the particular layout of the shelves 48, drawers, and other features may be modified to suit the particular needs of an end customer, e.g., to assist with the goal of using as much of the storage space as possible within the interior 18 for storing products. Also in accordance with this goal, it is desirable to reduce any negative impact on storage space when mounting temperature sensors within the cabinet 12. The sensor container 20 of this embodiment is connected to one of the sidewalls 30 adjacent an upper corner where that sidewall 30 meets the top wall 34, as the upper corners of the interior 18 are most often the unused space within these types of refrigerators 10. As a result, the sensor container 20 advantageously does not substantially interfere with use of the storage space for products within the interior 18. Such a mounting location of the sensor container 20 also allows for ready customer access to the temperature sensors held in the sensor container 20 as well as a fill port described in further detail below.

The sensor container 20 mounted on the sidewall 30 along the upper corner of the interior 18 in this embodiment is shown in further detail with reference to FIGS. 2 through 5. To this end, the sensor container 20 is shown as it would appear in use (except at FIG. 3, which is an exploded view for illustrative purposes), with a first temperature sensor 50 and a second temperature sensor 52 installed within dry wells 54 of the sensor container 20. The first and second temperature sensors 50, 52 are shown as different types of sensors or probes with different cross-sectional sizes, and the sensor container 20 is specifically designed to receive differently-shaped or sized temperature sensors 50, 52 such as in the embodiment shown. Of course, the same type of temperature sensor could be inserted into multiple ones of the dry wells 54 in other embodiments. The sensor container 20 is designed to hold temperature sensors 50, 52 in such a manner as to be surrounded by a ballast liquid, thereby enabling temperature measurements more consistent with thermal response of products stored within the cabinet 12, but without necessitating direct contact of the temperature sensors 50, 52 with air in the interior 18 or with the ballast liquid itself. It will be understood that the temperature sensors 50, 52 are conventional types of sensors and probes which can be supplied or purchased from various sources without departing from the scope of the present invention.

The sensor container 20 includes a main body portion 56 which receives a plurality of dry wells 54. The main body portion 56 and the dry wells 54 may be manufactured from a high density polyethylene in one example, although alternative types of plastics and other materials may be used in other embodiments. The main body portion 56 defines an elongated rectangular prism-shape in this embodiment, which is defined by a plurality of walls connected at generally rounded corners as shown. In this regard, the plurality of walls of the main body portion 56 more specifically includes a front panel 58 facing towards the door 16 when the sensor container 20 is installed in the refrigerator 10, a rear panel 60 opposite the front panel 58, a top panel 62 and a bottom panel 64 extending between the front and rear panels 58, 60, and opposing side panels 66 in this embodiment. The plurality of walls therefore encloses a hollow interior space 68 which is configured to receive the dry wells 54 and the ballast liquid, as initially described above. Although the design of the main body portion 56 in this embodiment is arranged for maximum efficiency of space used, it will be appreciated that the particular configuration and number of the plurality of walls may be modified in other embodiments consistent with this disclosure.

Furthermore, the use of the labels top, bottom, front, rear, etc. are provided for clarity and consistency with the mounting position shown in FIG. 1 of the refrigerator 10. But such labels should not be considered to limit the orientation of how the sensor container 20 can be mounted within the refrigerator 10, as they are provided for exemplary purposes only.

The main body portion 56 of the sensor container 20 also includes a pair of outwardly projecting wings 70 for connection to the sidewall 30 of the cabinet 12. In the embodiment shown in FIGS. 2 through 5, the wings 70 extend from the junction of one of the side panels 66 with each of the top panel 62 and the bottom panel 64. As shown most clearly in FIG. 4, the wings 70 extend generally parallel to the side panel 66 along most of the extent of the wings 70 such that the side panel 66 can be located parallel to the sidewall 30 of the cabinet 12 when the sensor container 20 is mounted in the refrigerator 10. A small curved portion 72 may be defined by each of the wings 70 so that the planar portions (parallel to the side panel 66) of the wings 70 are offset a small distance from the plane of the side panel 66, which avoids having the entire side panel 66 in abutting close contact with the sidewall 30 of the cabinet 12 when installed. Accordingly, cooled air in the interior 18 is located along substantially the entirety of the plurality of walls enclosing the hollow interior space 68, just like how the products stored in the refrigerator 10 are surrounded by the same air. Each of the wings 70 further includes an aperture 74 in this embodiment such that a threaded fastener (not shown) or some other coupling element can extend between the sensor container 20 and the cabinet 12 to secure these elements together. Furthermore, other alternative means of coupling the wings 70 to a cabinet wall may be used in still further embodiments, such as magnets, hook and loop fasteners, adherence, etc.

Therefore, the sensor container 20 is mounted within the refrigerator 10 in close proximity to the sidewall 30, which avoids substantial interference with the storage space within the interior 18, while remaining surrounded by the refrigerated air within the interior 18. It will be understood that other mounting features and devices may be included in alternative embodiments of the sensor container 20 without departing from the scope of this disclosure. Moreover, it will also be understood that the specific dimensions (both relative and absolute) of the various panels and features defining the sensor container 20 can be modified in other embodiments without departing from the scope of this disclosure (e.g., some of the dimensions will change in embodiments with more than three dry wells 54).

Figure 5:
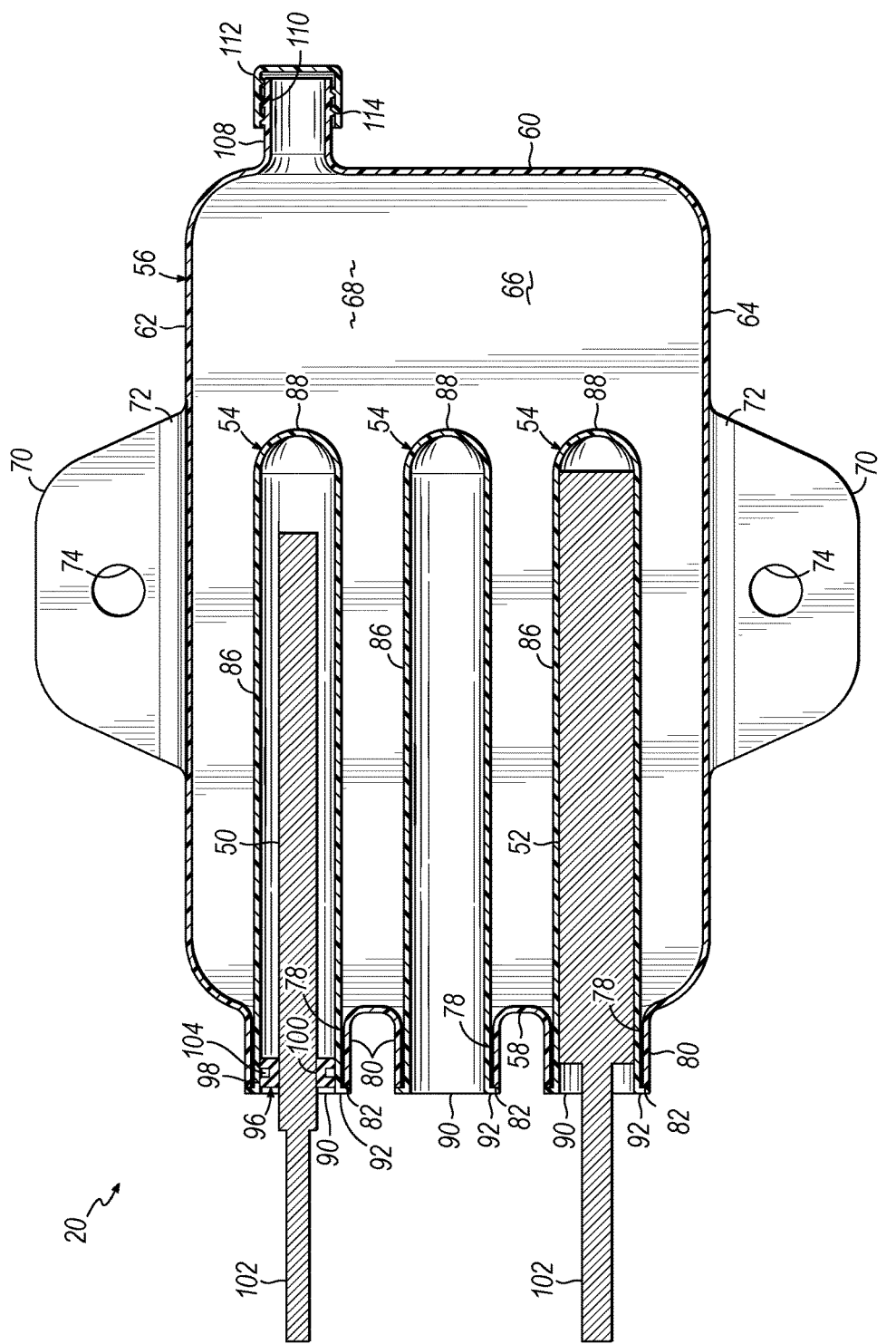
FIG. 5 is a cross-sectional front view of the sensor container and temperature sensors of FIG. 2, taken along line 5-5 in FIG. 2.

With continued reference to FIGS. 2, 3 and 5, the main body portion 56 of the sensor container 20 includes a plurality of openings 78 located along one of the plurality of walls, specifically the front panel 58 in the illustrated embodiment. To this end, the front panel 58 includes a plurality of neck portions 80 (three shown in the illustrated embodiment) projecting outwardly from the remainder of the front panel 58 to define the plurality of openings 78. The neck portions 80 are generally tubular and cylindrical in shape in this embodiment, although the cross-sectional shape can be modified to match a different corresponding shape of the dry wells 54 in further embodiments. Each of the neck portions 80 terminates at an end surface 82, which is a relatively small annular surface in the embodiment of FIGS. 2 through 5. The end surface 82 is specifically what defines the opening 78 for each of the neck portions 80, and these openings 78 would provide communication into the hollow interior space 68 but for the provision of the dry wells 54 as described below.

Each of the (three) dry wells 54 is defined by a tubular body 86 that extends between a closed end 88 and an open end 90. The open ends 90 define a radially outwardly projecting flange 92 as well. As a result, the cylindrical dry wells 54 of the illustrated embodiment have the shape and appearance of standard test tubes. The tubular body 86 is sized to be closely received one of the neck portions 80 when the sensor container 20 is assembled. After insertion of the dry wells 54 into the main body portion 56 at the openings 78, the closed end 88 of each dry well 54 is located within the hollow interior space 68 while the open end 90 of each dry well 54 is located proximate the opening 78 and end surface 82 of the corresponding neck portion 80. In the embodiment illustrated, the flange 92 on the open end 90 of a dry well 54 comes into abutting engagement with the end surface 82 of the neck portion 80 when the dry well 54 is in the proper installed position (see FIG. 5).

In order to maintain the dry wells 54 in this position shown in FIGS. 2 and 5, the dry wells 54 are permanently coupled to the main body portion 56 at a location at and/or near the corresponding opening 78 and open end 90. In one example, the dry wells 54 and main body portion 56 are formed from thermoplastic material, and the permanent coupling is made by welding these components together at the open end 90 and the corresponding neck portion 80. This welding could include ultrasonic welding, spin welding, or similar processes. Furthermore, the welding can occur along the neck portion 80 and tubular body 86 and/or along the abutting engagement of the end surface 82 and the flange 92. The permanent coupling of these elements may also be accomplished in other embodiments by other means such as adhesives, which may also depend on the particular materials selected for forming the parts of the sensor container 20. Regardless of the method chosen, the permanent coupling of the dry wells 54 in position at the neck portions 80 seals the interface of these elements at the neck portions 80 and/or the openings 78, thereby preventing any leaks of liquid from the hollow interior space 68 through the openings 78. To this end, a dry well 54 is permanently coupled in position in each of the openings 78 before the sensor container 20 is installed in the refrigerator 10 or shipped to the end customer. The dry wells 54 therefore form a seal so as to prevent fluid communication between the external environment and the hollow interior space 68 at the openings 78 along the front panel 58 of the main body portion 56.

As a result of the permanent coupling of the dry wells 54 in the assembled position shown in FIGS. 2 and 5, the dry wells 54 are maintained in a position where the substantial majority of the surface area defined by the tubular body 86 at each dry well 54 is surrounded by the hollow interior space 68. Thus, when a ballast liquid such as a glycol/water mixture fills the hollow interior space 68, this liquid will surround an entire periphery or cross-section of the dry wells 54 as most readily seen in the illustration at FIG. 4. It is clear that the temperature sensors 50, 52 will have measurements dampened by the presence of the ballast liquid in such an arrangement, as the ballast liquid separates the sensors 50, 52 from the refrigerated air in the cabinet 12 or other features of the refrigerator 10. However, the tubular body 86 of each dry well 54 is solid and therefore prevents liquid leaks into the spaces where the temperature sensors 50, 52 are positioned, avoiding the need from conventional designs to submerse the temperature sensors 50, 52.

As described briefly above, the first and second temperature sensors 50, 52 in the illustrated embodiment are not the same size. In other words, the first temperature sensor 50 located in an uppermost of the dry wells 54 is smaller than the second temperature sensor 52 located in a lowermost of the dry wells 54. For example, the first temperature sensor 50 may include a standard temperature probe without additional or specialized elements, while the second temperature sensor 52 may include a so-called heating probe, which is larger in size as a result of including a Peltier element or other thermoelectric device that may be used to test the probe at periodic intervals (e.g., by heating up the probe and determining what the response of the probe is to such heating). As shown in the cross-sectional views of FIGS. 4 and 5, the dry wells 54 are sized large enough to receive these larger types of heating probes or temperature sensors, shown schematically by the second temperature sensor 52. Of course, smaller sensors and probes like the first temperature sensor 50 may also be used in any or all of the dry wells 54. Any combination of known temperature sensors and probes may be used in the dry wells 54 described herein.

In order to accommodate the varying size of temperature sensors 50, 52, each of the dry wells 54 is further equipped with a retainer cap 96, one of which is shown in FIGS. 3 and 5. The retainer cap 96 is an annular-shaped element including an outer periphery 98 configured to engage one of the dry wells 54 at the open end 90 thereof, and also including a through aperture 100 sized to closely receive an outermost end portion (a non-sensing portion) of the temperature sensor 50, or a lead line 102 (e.g., wiring) extending from the temperature sensor 50. The retainer cap 96 is inserted into the open end 90 of the dry well 54 and forms a friction fit with the interior surface of the tubular body 86. For example, the retainer cap 96 may be formed from a resilient material and the outer periphery 98 provided with one or more grooves 104 enabling some deformation and movement of the retainer cap 96 into and out of position in the dry well 54. Different retainer caps 96 defining different sizes of the through aperture 100 may be provided to the end customer such that many different types of temperature sensors can be used with the sensor container 20. The specific materials and dimensions of the retainer caps 96 can be modified without departing from the scope of this disclosure.

The retainer cap 96 prevents fluid communication of cooled air from the refrigerated interior 18 into the tubular body 86 at the open end 90 of the dry well 54. Accordingly, even when the temperature sensor 50 is smaller in size than the open end 90 of the dry well 54, the sensing portion of the temperature sensor 50 (located inside the tubular body 86) can still be isolated from direct contact with refrigerated air in the refrigerated interior 18 and also isolated from the ballast liquid in the hollow interior space 68. As readily understood from FIG. 5, when a larger temperature sensor 52, such as a heating probe with a Peltier element, defines a cross section similar to the internal space within the dry well 54, then no retainer cap 96 is necessary to isolate the sensing portion of such a temperature sensor 52 from direct contact with the cooled air. To this end, each of the temperature sensors 50, 52 in the sensor container 20 measures temperature changes as dampened by the ballast liquid rather than direct air temperature changes, the latter of which may not be fully accurate approximations of temperature changes in products stored in the refrigerator 10.

The sensor container 20 of the embodiment shown in FIGS. 2 through 5 further includes a fill port 108 formed in the main body portion 56 along an opposite wall (rear panel 60) from the plurality of openings 78. Much like the neck portions 80 at the front panel 58, the fill port 108 projects outwardly from the rear panel 60 and includes an opening 110 communicating between the refrigerated interior 18 and the hollow interior space 68. In this regard, the ballast liquid can be injected into the hollow interior space 68 through the opening 110 of the fill port 108 after the remainder of the sensor container 20 is assembled, with the dry wells 54 permanently coupled to the main body portion 56 so as to form a seal and prevent fluid communication out of the hollow interior space 68 at all other portions of the sensor container 20. In the illustrated embodiment, the fill port 108 is located on the rear panel 60 so as to not interfere with the spacing of the openings 78 and dry wells 54 along the front panel 58, while also remaining generally parallel with the cabinet sidewall 30 to which the sensor container 20 is mounted. The fill port 108 also advantageously faces away from the door 16 when installed in the refrigerator 10, which reduces the likelihood of an accidental and undesired opening. The fill port 108 is also located proximate the top panel 62 and the uppermost portion or top end of the hollow interior space 68 so that the ballast liquid will not leak out in large quantities when the fill port 108 is opened, which could be done by a customer in some embodiments.

The sensor container 20 also includes a fill cap 112 that is coupled to the fill port 108 to prevent fluid communication through the opening 110 between the refrigerated interior 18 and the hollow interior space 68. During use, the fill cap 112 will remain installed on the fill port 108 to ensure that none of the ballast liquid leaks or flows out of the hollow interior space 68, such that the dry wells 54 and the temperature sensors 50, 52 contained therein remain surrounded by the ballast liquid. In the illustrated embodiment of the sensor container 20, the fill cap 112 is designed to be removable such that the opening 110 of the fill port 108 can be selectively re-opened when it is desired to drain and replace the ballast liquid, or otherwise service the sensor container 20. For example, the removable coupling can be accomplished by providing threads 114 on each of the fill port 108 and the fill cap 112 so that a threaded engagement closes and seals the opening 110 during use of the sensor container 20. However, it will be appreciated that other forms of selective, removable coupling such as snap/frictional engagement may be used in other embodiments without departing from the scope of this disclosure.

Furthermore, in some fields and for some customers, there will not be a desire or need to replace the ballast liquid in the sensor container 20. In such alternative embodiments, the fill cap 112 can be permanently coupled to the fill port 108 after the ballast liquid is flowed into the hollow interior space 68. The permanent coupling can be made by many of the same methods as described above for positioning the dry wells 54 in the main body portion 56, including, for example, by ultrasonic or spin welding or by adhesive bonding.

As described above, the sensor container 20 of this embodiment includes first, second, and third dry wells 54 permanently coupled to the openings 78 at the neck portions 80 defined in the main body portion 56. Alternative embodiments not illustrated in the Figures may include even more than three dry wells 54 in the sensor container 20. In the exemplary installation in refrigerator 10 as described in the following paragraphs, the sensor container 20 is pre-installed in the refrigerator 10 with the first and second temperature sensors 50, 52 in two of the three dry wells 54 prior to delivery to the end customer (as well as filled with the ballast liquid, thereby eliminating setup by the end customer). The third dry well 54 is left empty and can be used by the end customer to mount a third temperature sensor (not shown in FIGS. 2 through 5), which may be used for different purposes than the other sensors or for redundancy. For example, a customer may have a separate alarm system which it is desired to connect a temperature probe to, and such a temperature probe could be added in the empty dry well 54. Consequently, the sensor container 20 of the illustrated embodiment advantageously provides sufficient mounting capability for pre-installed sensor(s) as well as later-installed sensor(s). Although the middle dry well 54 is left open in the Figures, it will be understood that the two temperature sensors 50, 52 may be placed in any of the dry wells 54 before delivery to the end customer. Moreover, the sensor container 20 (with or without the temperature sensors) may be manufactured separately from the refrigerator 10 and then shipped to the end customer for installation in existing refrigerators and freezers in other embodiments.

In operation, the sensor container 20 of the illustrated embodiment is mounted on the sidewall 30 of the cabinet housing 14 as shown in FIG. 1. To this end, the tubular bodies 86 of the dry wells 54 are configured to extend generally horizontally within the hollow interior space 68 when the sensor container 20 is in the installed position. This arrangement contrasts with many of the conventional designs which placed sensors in a vertical orientation when placing temperature sensors in a ballast liquid. By having the dry wells 54 and also the elongate length of the main body portion 56 extend horizontally in the installed condition, several advantages are achieved by the sensor container 20.

For example, the sensor container 20 can be mounted higher in the cabinet 12 and substantially at the upper corner defined by the junction of the top wall 34 and the sidewall 30 of the cabinet housing 14. This arrangement is possible because the fill port 108 and the dry wells 54 do not need to be accessed through the top panel 62 of the sensor container 20, and thus, little to no clearance is required above the sensor container 20 in the cabinet 12. As described above, these upper corners are typically the least-used space within laboratory refrigerators, so positioning the sensor container 20 in this location ensures that the sensor container 20 does not substantially interfere with the typically used storage space defined within the refrigerated interior 18. Of course, different mounting locations and orientations (with slight variations from truly horizontal dry wells 54, so long as the advantages described herein can still be achieved with whatever slightly modified mounting orientation is chosen) are possible, particularly when the sensor container 20 is added as a retrofit to an existing refrigerator by the end customer.

Moreover, this arrangement of the sensor container 20 allows for the end customer to drain and replace the ballast liquid (when a removable fill cap 112 is provided) from a sensor container 20 dismounted from the refrigerator 10. This arrangement of the sensor container 20 also allows for the end user to remove, replace, and/or add new temperature sensors without necessitating dismounting of the entire sensor container 20 from the refrigerator 10. For some customers, these are actions which are taken frequently enough to make removing the need for mounting and dismounting the sensor container 20 a significant time advantage. To this end, the sensor container 20 advantageously provides multiple dry wells 54 for customer use and reconfiguration as needed based on the current use of the refrigerator 10, while avoiding the risk of ballast liquid spills in the cabinet 12 when such actions are performed.

With continued reference to FIG. 1, one exemplary arrangement of what the temperature sensors 50, 52 are connected to in the refrigerator 10 is shown. To this end, the first temperature sensor 50 is connected to the chart recorder 42, which is shown schematically in FIG. 1, but is typically mounted somewhere on the cabinet 12. In one example, the door 16 or the front wall 36 of the cabinet housing 14 may be provided with a blank panel in refrigerators 10 without a chart recorder 42, and the chart recorder 42 is installed at the location of the blank panel for customers who require such a device. The chart recorder 42 records a history of the temperatures measured by the first temperature sensor 50 over the course of a few hours, days, etc. for later review, if necessary, by the customer. Thus, the chart recorder 42 of the illustrated embodiment provides a recording of temperature history for approximated product temperature during storage in the refrigerator 10, and the first temperature sensor 50 is only connected to the chart recorder 42 for this particular purpose.

The second temperature sensor 52 of this embodiment is connected to the display and alarm device 44, which is shown in FIG. 1 to include a small interface or panel on the door 16 of the refrigerator 10. In contrast to the chart recorder 42, the display and alarm device 44 provides a real-time visual indication to a customer what the temperature is inside the cabinet 12 at the interior 18. The display and alarm device 44 also generates a visual and/or audible alarm when the temperature inside the cabinet 12 falls outside a preferred range which is typically set by the customer and based on the products stored in the refrigerator 10. For example, in refrigeration contexts where the desired set point is 4° C., the alarm may be set to activate whenever the temperature sensed by the second temperature sensor 52 goes below 2.5° C. or above 5.5° C., e.g., temperatures which risk freezing or warming the product beyond the desired temperature range. In a freezer context with a set point of −25° C. or below, the alarm may be set to activate when the second temperature sensor 52 detects a temperature exceeding −15° C. The second temperature sensor 52 of this embodiment is connected to the display and alarm device 44 for solely these purposes. As set forth above, the customer may employ a separate alarm device or centralized alarm system which uses a third temperature sensor mounted by the customer in the sensor container 20, and in such embodiments, there may be just a display device instead of the display and alarm device 44 described herein.

Accordingly, in the illustrated embodiment of FIG. 1, the first and second temperature sensors 50, 52 in the sensor container 20 are not connected to the refrigeration system 26 that controls the temperature changes in the cabinet 12. Instead, in this embodiment the open-air sensor 28 is connected to the controller of the refrigeration system 26 and possibly also to a user interface panel 120 which may be provided on the front wall 36 or the door 16 of the cabinet 12. As described above, the air temperature may fluctuate more rapidly than the temperature of products stored in the refrigerator 10, and as such, using the open-air sensor 28 allows for the refrigeration system 26 to be activated as necessary to keep the products within the desired temperature range, albeit with a somewhat increased risk of "false positive" activations of the refrigeration system 26 when a temperature variation detected by the open-air sensor 28 is merely transitory in nature. Nevertheless, in such embodiments, this arrangement may advantageously provide additional buffer or assurance that the products will not fall outside the desired temperature range. To this end, the peak variations of temperature within the interior 18 of the cabinet 12 are minimized when configuring the refrigerator 10 such that none of the temperature sensors located inside the sensor container 20 are used to control the temperature in the cabinet 12 (via control of the refrigeration system 26). Additionally, any type of sensor or probe can be used in conjunction with the refrigeration system 26, as the size and shape will not be limited by the maximum dimensions of the dry wells 54 in the sensor container 20 in such an embodiment.

For some customers, an alternative embodiment is possible in which one of the temperature sensors held within the sensor container 20 does communicate with the refrigeration system 26 and is therefore used either alone or in combination with a direct air sensor to control the temperature in the interior 18. This connection is not shown in the illustrated embodiment described in detail above. Such alternative embodiments could be desirable where the products stored in the refrigerator 10 are not as highly sensitive to small temperature variations outside a desired range or set point, at least as compared with blood or some types of medicines. In embodiments with multiple control temperature sensors in the open air of the interior 18 and in one of the dry wells 54 of the sensor container 20, it will be understood that algorithms at the main controller of the refrigerator 10 would be used to coordinate control of the refrigeration system 26 based on the multiple sensor outputs. As set forth above, the sensor container 20 provides an advantageous mounting for temperature sensors within a ballast liquid, but the particular end functionality and use of the sensors within the sensor container 20 may vary depending on the embodiment selected by the end customer.

Thus, the sensor container 20 described herein advantageously removes many of the customer set-up and installation steps necessary with conventional sensor bottle designs, while still providing a reliable mounting for a plurality of temperature sensors to be held within a ballast liquid. To this end, the dry wells 54 of the sensor container 20 receive different types and sizes of temperature sensors 50, 52 and surround those sensors with ballast liquid, while maintaining separation from direct contact with either the ballast liquid or the cooled air in the interior 18 of the refrigerator 10. As a result, the temperature sensors 50, 52 used with the sensor container 20 do not need to be submersible. The ballast liquid is also effectively sealed within a closed container defined by the hollow interior space 68 when the fill cap 112 is in position, which results in no spill or leak risk during use. Additionally, the sensor container 20 is configured to be mounted at an often-unused space within the cabinet 12 so as to avoid significant interference with the customer's usage of storage space within the refrigerator 10. Because the sensor container 20 is mounted directly to the cabinet 12 at the wings 70, there is no need for an additional bracket to be manufactured and separately installed in the refrigerator 10, as is used with conventional designs. The refrigerator 10 with the sensor container 20 therefore provides numerous advantages and benefits in the field of mounting and using temperature sensors and probes in laboratory refrigerators and freezers.

While the present invention has been illustrated by a description of an exemplary embodiment and while this embodiment has been described in considerable detail, it is not the intention of the applicant to restrict or in any way limit the scope of the appended claims to such detail. Additional advantages and modifications will readily appear to those skilled in the art. For example, similar embodiments of a refrigerator configured to set a desired interior temperature at a different temperature such as +5° C., −20° C., or −30° C. may be used, for example, with corresponding adjustments in structure as needed, such as the removal of the glass window 40 in the door 16 and the use of a solid insulated door in those embodiments at −20° C. or −30° C. The invention in its broader aspects is therefore not limited to the specific details, representative apparatus and method, and illustrative example shown and described. Accordingly, departures may be made from such details without departing from the spirit or scope of Applicant's general inventive concept.

What is claimed is:

1. A sensor container for positioning at least one temperature sensor within a refrigerated interior of a refrigerator cabinet having a cabinet opening closeable by a door, the sensor container comprising:
   a main body portion including a plurality of walls enclosing a hollow interior space configured to receive a ballast liquid, the main body portion also including a plurality of openings located in at least one of the plurality of walls;
   a plurality of dry wells configured to receive a temperature sensor, each of the dry wells including a tubular body inserted into the main body portion so as to extend between a closed end located within the hollow interior space and an open end permanently coupled to the main body portion at one of the plurality of openings, the open ends of the plurality of dry wells forming a seal so as to prevent fluid communication between the hollow interior space and the refrigerated interior at the plurality of openings, wherein the tubular body of each of the plurality of dry wells extends generally horizontally within the hollow interior space when the sensor container is installed within the refrigerator cabinet;
   a fill port formed in the main body portion and configured to selectively provide communication between the hollow interior space and an external environment outside the sensor container, such that the ballast liquid can be drained and/or refilled when necessary; and
   a fill cap coupled to the fill port to prevent fluid communication through the fill port when the sensor container is filled with ballast liquid, wherein the fill cap is removably coupled to the fill port, and the fill port is provided proximate to a top end of the hollow interior space when the sensor container is installed within the refrigerator cabinet,
   wherein when the at least one temperature sensor is inserted into the plurality of dry wells, the ballast liquid within the hollow interior space surrounds the at least one temperature sensor without contacting the at least one temperature sensor, thereby isolating the at least one temperature sensor from direct contact with refrigerated air in the refrigerated interior and also dampening sensor response to temperature fluctuations in the refrigerated air within the refrigerated interior, and
   wherein the plurality of openings is provided along a single one of the plurality of walls, and the fill port is provided in a different one of the plurality of walls located on an opposite side of the main body portion from the plurality of openings, so as to have the fill port face away from the cabinet opening and the door when the sensor container is installed within the refrigerator cabinet.

2. The sensor container of claim 1, wherein the main body portion further comprises:
   a plurality of neck portions projecting outwardly from one of the plurality of walls to thereby define the plurality of openings, each of the neck portions including an end surface; and
   wherein each of the plurality of dry wells further comprises:
   a flange projecting radially outwardly from the tubular body at the open end thereof, the flange positioned in an abutment with the end surface of a corresponding one of the plurality of neck portions when permanently coupling the plurality of dry wells to the main body portion.

3. The sensor container of claim 2, wherein the tubular body of each of the plurality of dry wells is welded to the corresponding one of the plurality of neck portions adjacent the abutment of the flange and the end surface in order to permanently couple these elements together.

4. The sensor container of claim 1, wherein the plurality of openings include first, second, and third openings, and wherein the plurality of dry wells include first, second, and third dry wells.

5. The sensor container of claim 4, wherein at least one of the first, second, and third dry wells is sized large enough to receive temperature sensors containing Peltier elements.

6. The sensor container of claim 5, wherein each of the first, second, and third dry wells includes a retainer cap removably inserted into the corresponding open end to thereby prevent air flow into the corresponding dry well when a temperature sensor smaller in size than the open end is inserted into the corresponding dry well.

7. The sensor container of claim 1, further comprising:
   first and second temperature sensors positioned in two of the plurality of dry wells, the first and second temperature sensors providing temperature measurement signals to at least one of:
   a display and alarm device on the refrigerator cabinet; and
   a chart recorder for recording temperature over time in the refrigerator cabinet.

8. The sensor container of claim 7, wherein the first and second temperature sensors are not connected to a refrigeration system associated with the refrigerator cabinet, such that the temperature measurement signals are not used to control the temperature within the refrigerated interior.

9. A refrigerator, comprising:
   a cabinet having a refrigerated interior;
   a refrigeration system for circulating a refrigerant and for removing heat energy from the refrigerated interior; and
   a sensor container for positioning at least one temperature sensor within the refrigerated interior, the sensor container further comprising:
   a main body portion including a plurality of walls enclosing a hollow interior space configured to receive a ballast liquid, the main body portion also including a plurality of openings located in at least one of the plurality of walls; and
   a plurality of dry wells, each including a tubular body inserted into the main body portion so as to extend between a closed end located within the hollow interior space and an open end permanently coupled to the main body portion at one of the plurality of openings, the open ends of the plurality of dry wells forming a seal to prevent fluid communication between the hollow interior space and the refrigerated interior at the plurality of openings;
   wherein when at least one temperature sensor is inserted into the plurality of dry wells, the ballast liquid within the hollow interior space surrounds the at least one temperature sensor without contacting the at least one temperature sensor, thereby isolating the at least one temperature sensor from direct contact with refrigerated air in the refrigerated interior and also dampening sensor response to temperature fluctuations in the refrigerated air within the refrigerated interior, wherein the tubular body of each of the plurality of dry wells extends generally horizontally within the hollow interior space when the sensor container is installed within the cabinet, thereby enabling insertion and removal of the at least one temperature sensor to and from the plurality of dry wells without such movement being occluded by a top wall of the cabinet, and wherein the refrigerated interior is accessible through a cabinet opening and a door located along the cabinet opening, the plurality of openings in the main body portion of the sensor container are provided along a single one of the plurality of walls which faces towards the cabinet opening and the door, and the sensor container further comprises:

a fill port formed in the main body portion and configured to selectively provide communication between the hollow interior space and an external environment outside the sensor container, such that the ballast liquid can be drained and/or refilled when necessary, the fill port being provided in a different one of the plurality of walls located on an opposite side of the main body portion from the plurality of openings, so as to face away from the cabinet opening and the door.

10. The refrigerator of claim 9, wherein the refrigerated interior defines a storage space located inside a plurality of sidewalls, a top wall, and a bottom wall of the cabinet, and the sensor container is coupled to one of the plurality of sidewalls at a location proximate the top wall, such that the sensor container does not substantially interfere with use of the storage space defined within the refrigerated interior.

11. The refrigerator of claim 9, wherein the main body portion of the sensor container further comprises:

a plurality of neck portions projecting outwardly from one of the plurality of walls to thereby define the plurality of openings, each of the neck portions including an end surface; and wherein each of the plurality of dry wells of the sensor container further comprises:

a flange projecting radially outwardly from the tubular body at the open end thereof, the flange positioned in an abutment with the end surface of a corresponding one of the plurality of neck portions when permanently coupling the plurality of dry wells to the main body portion.

12. The refrigerator of claim 9, wherein the sensor container further comprises:

a fill port formed in the main body portion and configured to selectively provide communication between the hollow interior space and an external environment outside the sensor container, such that the ballast liquid can be drained and/or refilled when necessary; and a fill cap coupled to the fill port to prevent fluid communication through the fill port when the sensor container is filled with ballast liquid and in use.

13. The refrigerator of claim 12, wherein the fill cap is removably coupled to the fill port, and the fill port is provided proximate to a top end of the hollow interior space when the sensor container is installed within the cabinet.

14. A refrigerator, comprising:

a cabinet having a refrigerated interior;

a refrigeration system for circulating a refrigerant and for removing heat energy from the refrigerated interior;

a sensor container for positioning at least one temperature sensor within the refrigerated interior, the sensor container further comprising:

a main body portion including a plurality of walls enclosing a hollow interior space configured to receive a ballast liquid, the main body portion also including a plurality of openings located in at least one of the plurality of walls; and a plurality of dry wells, each including a tubular body inserted into the main body portion so as to extend between a closed end located within the hollow interior space and an open end permanently coupled to the main body portion at one of the plurality of openings, the open ends of the plurality of dry wells forming a seal to prevent fluid communication between the hollow interior space and the refrigerated interior at the plurality of openings;

wherein when at least one temperature sensor is inserted into the plurality of dry wells, the ballast liquid within the hollow interior space surrounds the at least one temperature sensor without contacting the at least one temperature sensor, thereby isolating the at least one temperature sensor from direct contact with refrigerated air in the refrigerated interior and also dampening sensor response to temperature fluctuations in the refrigerated air within the refrigerated interior, first and second temperature sensors positioned in two of the plurality of dry wells of the sensor container; and at least one of:

a display and alarm device on the cabinet; and a chart recorder for recording temperature over time in the cabinet, wherein the first and second temperature sensors are connected to and provide temperature measurement signals to the display and alarm device and/or to the chart recorder, and wherein the first and second temperature sensors are not connected to the refrigeration system, such that all temperature measurement signals received from temperature sensors in the sensor container are not used to control the temperature within the refrigerated interior.

* * * * *